United States Patent
Moran

[11] 4,193,088
[45] Mar. 11, 1980

[54] OPTICAL HETERODYNE SYSTEM FOR IMAGING IN A DYNAMIC DIFFUSIVE MEDIUM

[75] Inventor: Steven E. Moran, Lakeside, Calif.

[73] Assignee: The United States of America as represented by the Secretary of the Navy, Washington, D.C.

[21] Appl. No.: 930,283

[22] Filed: Aug. 2, 1978

[51] Int. Cl.$^2$ .............................................. H04N 7/18
[52] U.S. Cl. .................................... 358/95; 356/349; 455/609
[58] Field of Search ................. 250/199; 358/95, 99, 358/90; 356/5, 349, 360; 313/381

[56] References Cited

U.S. PATENT DOCUMENTS

| | | | |
|---|---|---|---|
| 2,541,374 | 2/1951 | Morton | 313/381 |
| 3,278,753 | 10/1966 | Pitts et al. | 356/5 |
| 3,426,207 | 2/1969 | Fried et al. | 250/199 |
| 3,445,588 | 5/1969 | Nicholson | 358/95 |
| 3,566,021 | 2/1971 | Jakes, Jr. | 250/199 |
| 3,670,098 | 6/1972 | Korpel | 356/349 |
| 4,030,831 | 6/1977 | Gowrinathan | 356/349 |
| 4,042,822 | 8/1977 | Brandewie et al. | 356/5 |

OTHER PUBLICATIONS

Mandel-Heterodyne Detection of Weak Light Beam—Jour. of Optical Soc. of Amer. vol, 56, #9, Sep. 1966, pp. 1200–1206.
Mandel and Wolf–Optimum Conditions for Heterodyne Detection of Light, Jour. Opt. Soc. of America, vol. 65, #4, Apr. 1975, pp. 413–418.

*Primary Examiner*—Robert L. Griffin
*Assistant Examiner*—Joseph A. Orsino, Jr.
*Attorney, Agent, or Firm*—Richard S. Sciascia; Ervin F. Johnston; James O. Skarsten

[57] ABSTRACT

A system for providing an image of an object from a coherent light signal transmitted from the object through a dynamic diffusive medium is provided with a planar surface receiving the signal wavefront, the received wavefront comprising an array of discrete picture elements. A local oscillator signal is mixed with each picture element in a selected order to provide light responsive signals which represent the distribution of power over frequency of each picture element, all of the frequency components of the light responsive signals being included in a first frequency range of selected bandwidth which is centered around an intermediate frequency. A narrow-band electronic filter receives each of the light responsive signals and removes all frequency components therefrom which are not included in a second, narrow, bandwidth centered around the intermediate frequency. An image of the object is provided by electronic apparatus which receives the filtered signals.

11 Claims, 3 Drawing Figures

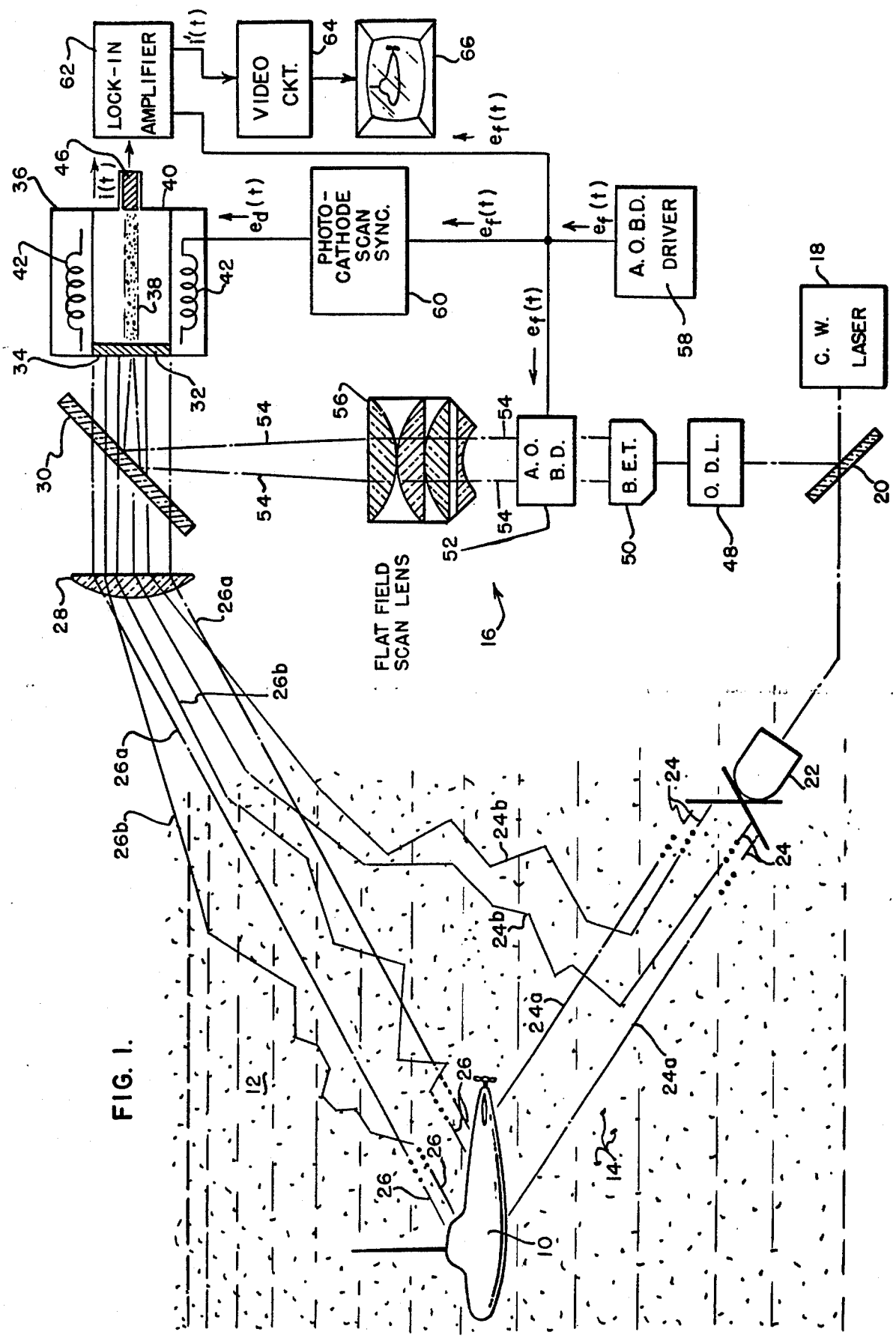

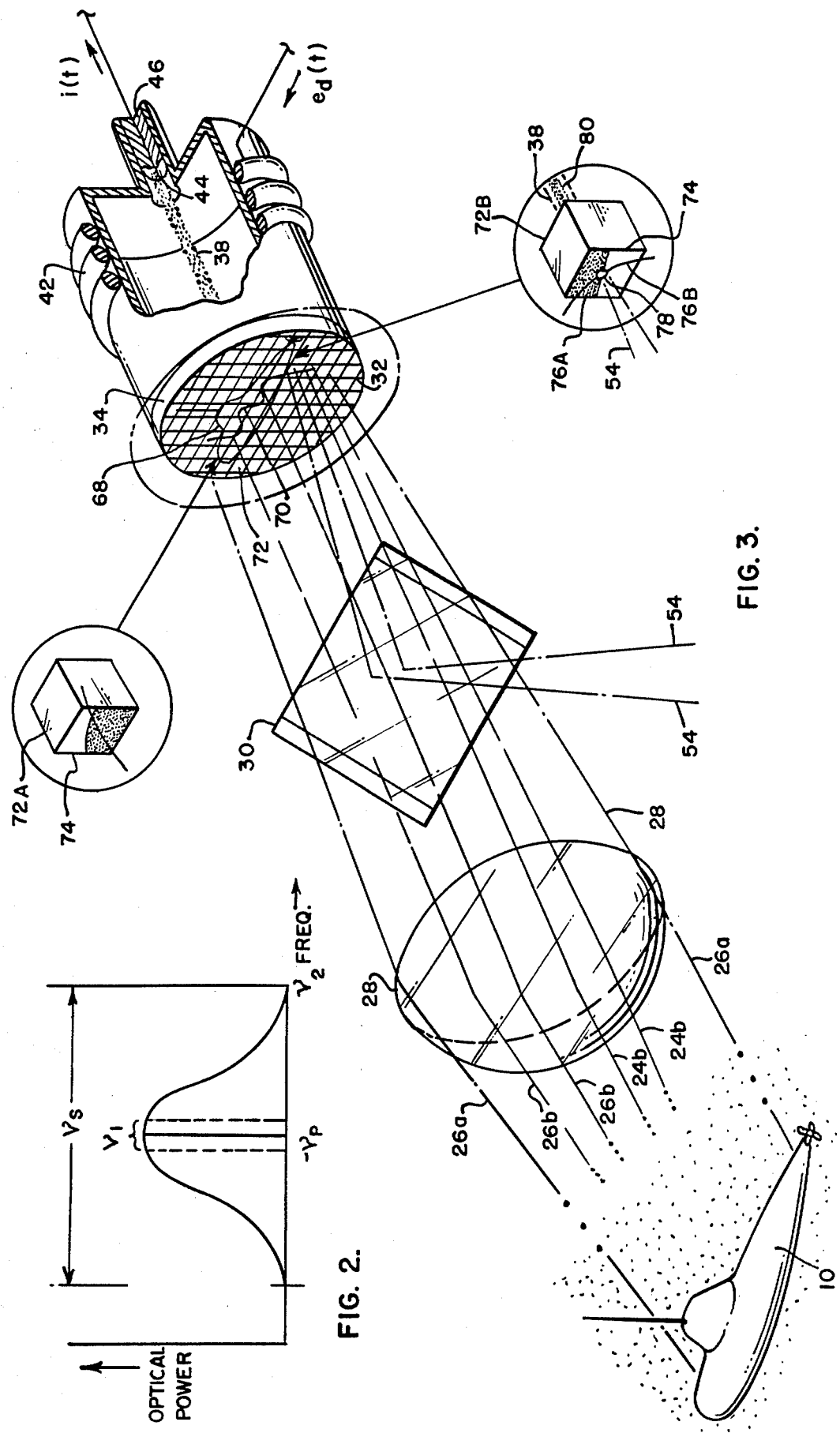

OPTICAL HETERODYNE SYSTEM FOR IMAGING IN A DYNAMIC DIFFUSIVE MEDIUM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains to a system for optical heterodyne imaging. More particularly, the invention pertains to an optical heterodyne imaging system for viewing an object through a medium or environment containing diffused dynamic particles.

The range at which an optical system viewing through a diffusive medium may form an image of an object is substantially limited by the phenomenon of forward scatter, and, if the object is illuminated by light projected from the viewing system, by the phenomenon of backscatter. A diffusive medium is a medium such as fog or seawater, which contains diffused particulate matter, and a dynamic diffusive medium is a medium in which particles are in constant random motion. Forward scatter is the scattering of light transmitted from an object to the viewing system as the result of random refractions by the particles, and some of the scattered light is sensed by the viewing system. While some of the light transmitted from the object will reach the viewing system without interacting with any particles, and will therefore provide an image of the object, the sensed scattered light will degrade the image. If the viewing system is more than a limited distance from the object, the image will be totally unviewable. For example, if seawater contains an amount of silt or other refractive particulate matter, a conventional viewing device such as a television camera would be unable to distinguish an object located more than 15 attenuation lengths away.

Backscatter is the scattering of light projected from a source of light by the particles of a diffusive medium, where some of the light is reflected back toward the source. It is clear that backscatter will further degrade an image of an object which is viewed by a system which must illuminate the object.

Some techniques are presently available for overcoming the detrimental effects of backscatter in a diffusive medium such as seawater. For example, volume scanning or range gating may be employed. However, as far as is known, no system or techniques are presently available for overcoming the degradation of an image viewed through a diffusive medium which is caused by the phenomenon of forward scatter.

SUMMARY OF THE INVENTION

The present invention provides an optical heterodyne system for providing an image of an object from a coherent light signal which is transmitted from the object to the apparatus through a dynamic diffusive medium, an image of the object being carried upon the wavefront of the transmitted coherent light signal, the transmitted coherent light signal comprising frequency components included in a first frequency bandwidth which is centered at a first optical frequency. The system includes planar means for receiving the wavefront of the transmitted light signal, the planar means comprising an array of incremental areas. The invention also includes a means for providing a local oscillator coherent light signal of a second frequency, the first and second frequencies being different, the difference therebetween being equal to an intermediate frequency. The apparatus of the invention further employs means for mixing the local oscillator coherent light signal with light impinging upon each incremental area to provide light responsive signals in a selected order, each of the light responsive signals representing light of the transmitted light signal which impinges upon one of the incremental areas. The light responsive signals include frequency components contained within a second bandwidth equal to the first bandwidth, the second bandwidth being centered around the aforementioned intermediate frequency. Means receiving each light responsive signal filter all frequency components therefrom which are not included in a third bandwidth centered around the intermediate frequency, the third bandwidth being substantially narrower than second bandwidth. The filtered light responsive signals are received by a display or other processing means to provide an image of the object.

Preferably, the mixing means comprises a means for sequentially focusing the local oscillator coherent light signal within an Airy disc on each of the incremental areas of the planar receiving means, the area of the Airy disc being no greater than each of the incremental areas. The planar receiving means preferably comprises a photosensitive planar surface comprising an array of light sensitive surfaces, each of the light sensitive surfaces comprising one of the incremental areas, and each of the light sensitive surfaces comprising part of a light responsive element which generates one of the light responsive signals.

In a preferred embodiment of the invention, the planar receiving means comprises the detector plane of a photocathode of an image dissector. As the local oscillator signal is sequentially focused on each incremental area, or discrete light sensitive surface, of the detector plane, electron streams are sequentially projected into the drift tube of the image dissector, each electron stream including frequency components, at electronic frequencies, which respectively represent the optical frequency components of the light of the transmitted light signal which impinges upon one of the light sensitive surfaces. All of the representing frequency components of the electron streams are included in a frequency spectrum centered around the aforementioned intermediate frequency which has the same width as the frequency spectrum of the transmitted light.

Each of the projected electron streams is directed through an aperture in the drift tube to an electron multiplier, the electron multiplier generating a current which includes the frequency components of each of the projected electron streams, and the respective power distributions thereover. The current is coupled to a narrow-band filter which removes all of the frequency components from the current which are not included within a very narrow bandwidth centered at the intermediate frequency. The filtered current is coupled to a display means, which provides a visually observable display of the object.

It is anticipated that an embodiment of the invention may be usefully employed to extend the range at which the scatter problem may be overcome in viewing through a dynamic diffusive medium by in excess of a factor of 2 over presently available systems.

OBJECTS OF THE INVENTION

An object of the invention is to provide a system for substantially extending the range at which an object may be viewed through a dynamic diffusive medium, such as fog or seawater containing minute refractive particles.

Another object is to overcome the effects of forward scatter and back scatter in a system for viewing an object through a dynamic diffusive medium.

Another object is to provide a system for viewing an object through a dynamic diffusive medium which employs optical heterodyne imaging techniques in an apparatus therefore.

These and other objects of the invention will become more readily apparent from the ensuing specification when taken together with the drawings.

BRIEF DESCRIPTION OF THE DRAWINGS

FIG. 1 is a block diagram showing an embodiment of the invention, including a means for projecting coherent light toward an object to be imaged through a dynamic diffusive medium.

FIG. 2 shows a plot of optical power versus frequency which is useful for understanding the principal of the invention.

FIG. 3 is a perspective view showing an image dissector tube for the embodiment of FIG. 1 having a portion broken away.

DESCRIPTION OF THE PREFERRED EMBODIMENT

Referring to FIG. 1, there is shown an object such as a submarine 10 located in a medium 12 such as a body of seawater, which contains a diffusion of dynamic refractive particles 14. Apparatus 16, for viewing submarine 10, is also located in medium 12, and is provided with continuous wave laser 18. Laser 18 comprises an argon laser, model 95-4, manufactured by the Lexel Corporation, and provides a source of coherent light of frequency $\nu_p$. Light from laser 18 is coupled through beam splitter 20 to microscopic objective lens 22, which is oriented toward submarine 10 so that coherent light beam 24 from laser 18 is projected toward submarine 10. Light is projected with sufficient power to travel a distance of 10–15 attenuation lengths through medium 12, the distance of submarine 10 from apparatus 16, and to be reflected from submarine 10 back to apparatus 16. Forward scatter generally becomes a significant problem at distances which exceed 10 attenuation lengths.

Light beam 24a represents light of projected beam 24 which passes between the particles 14 without interaction therewith or refraction therefrom. Light 24b, on the other hand, represents light of projected beam 24 which has been scattered by particles 14 and has been refracted back to viewing apparatus 16, light 24b representing the phenomenon of back scatter.

Referring again to FIG. 1, there is shown a beam or signal of coherent light 26 projected from submarine 10 toward apparatus 16 through medium 12, light beam 26 comprising some of the light of light beam 24a which is reflected from submarine 10 back toward apparatus 16, an undistorted image of submarine 10 thereby being carried on the wavefront or field of beam 26. Coherent light beam 26a represents a component of reflected light beam 26 which travels from submarine 10 to lens 28, the light receiving element of apparatus 16, without being refracted from or interacting with any of the particles 14 in medium 12. Consequently, coherent light beam 26a carries an undistorted image of submarine 10 upon its wavefront, and has a frequency of $\nu_p$, the frequency of continuous laser 18, the source of projected beam 24.

Light 26b represents another component of light received through lens 28, i.e., light of beam 26 which is refracted from, or forward scattered by, particles 14. It will be readily apparent that, while coherent light beam 26a carries upon its wavefront a clear and undistorted image of submarine 10, such image will be degraded at apparatus 16 by back scattered light 24b and forward scattered light 26b, the image being completely unviewable if apparatus 16 is more than 15 attenuation lengths from submarine 10 in a body of seawater containing any amount of silt or other particles.

PRINCIPAL OF OPERATION OF APPARATUS

As aforementioned, the image-bearing light beam 26a is of a single optical frequency, $\nu_p$. However, scattered light represented by 24b and 26b in FIG. 1 is not of a single frequency but rather, includes frequency components distributed over a continuous frequency spectrum centered at $\nu_p$. The scattered light in a dynamic diffusive medium includes a spectrum of frequency components as the result of Doppler shift. As is well known, when light is scattered from a particle in motion, the frequency of the light is shifted by an amount $\Delta\nu$ determined by the direction and speed of the particle. If $\bar{K}_i$ and $\bar{K}_s$ are respectively the incident and scattered field wave vectors of light colliding with a particle, and if V is the velocity vector of the particle, then $\Delta\nu = \bar{K}\cdot\bar{V}$, where $\bar{K} = \bar{K}_i - \bar{K}_s$. For a particle velocity of one centimeter per second and a wavelength of 514 nanometers for example, the scattered field could experience Doppler shifts from the central frequency of the unscattered field light frequency spectrum of up to 244 KHz. Since each scattering particle will, in general, have a different velocity, there will be a distribution of particle velocities within the medium resulting in a continuous optical spectrum for the scattered light.

Referring to FIG. 2, there is shown the aforementioned spectrum, or distribution of optical power over frequency, which is received by apparatus 16 through lens 28, the spectrum having a bandwidth of $\nu_S$. It will be readily apparent that the interfering effects of back scattered light 24b and of forward scattered light 26b, respectively, could be effectively eliminated by passing all of the light of the spectrum shown in FIG. 2 through an optical narrow-band filter. All light having frequency components not included within a very narrow bandwidth $\nu_I$, centered around projection frequency $\nu_P$, would thereby be removed, the removed light including most of the interfering scattered light. However, the present state of the art does not provide any such narrow-band optical filter. Therefore, the apparatus of Applicant's invention provides an optical heterodyne imaging system, which shifts the frequency spectrum shown in FIG. 2 from a range of optical frequencies to a range of electronic frequencies. An electronic filter having a narrow passband is then employed to remove the interfering effects of scattered light, and a viewable image of submarine 10 is obtained from a filtered electronic signal by means of a conventional electronic display.

Structure for a preferred embodiment of an optical heterodyne imaging system is hereinafter disclosed, and employs some of the elements and teachings of a system for optical heterodyne imaging in general, which is disclosed in a copending patent application of Applicant, entitled "Scanning Focused Local Oscillator Optical Heterodyne System", filed with the U.S. Pat. and Trademark Office under Ser. No. 921,663 on July 3, 1978.

Structure of Apparatus

Light detectable at apparatus 16, comprising, as aforementioned, a directly reflected component 26a, which provides an undistorted image of submarine 10, and a scattered component, comprising back scatter and forward scatter light 24b and 26b respectively, is focused by lens 28, through beam splitter 30, upon the detector plane 32 of photocathode 34 of image dissector 36. Image dissector 36 may comprise an apparatus well known in the field, such as a vidisector camera manufactured by the Aerospace/Optical Division of ITT.

As will be hereinafter described in greater detail in conjunction with FIG. 3, photocathode 34 may be considered to comprise an array of light responsive elements, each light responsive element comprising a discrete incremental section of photocathode 34. Each photocathode element has a light sensitive surface, comprising a discrete incremental area of detector plane 32. The light focused by lens 28 which impinges upon a particular light sensitive surface comprises a picture element, and a particular picture element is identified by a particular light sensitive surface. Each picture element therefore comprises a small but finite point of light impinging upon detector plane 32 at an identifiable location, and has two components. One component of a picture element is a coherent light signal of frequency $v_P$, which represents a small portion of the image of submarine or other object 10. The other component is scattered light, the power of the scattered light being distributed over a range of frequencies $v_S$. For example, $v_S$ may have a bandwidth in excess of 200 kHz.

In accordance with the operation of image dissector 36, the picture element impinging upon a given light responsive element causes an electron stream 38 to be projected into drift tube 40 of image dissector 36. Image dissector 36 is provided with deflection coils 42 for deflecting electron stream 38 projected through drift tube 40, and in response to a deflection signal $e_d(t)$, coils 42 deflect the stream of electrons generated by a given light responsive element through an aperture 44 to dynode chain 46. Dynode chain 46 comprises an electron multiplier which multiplies the number of received electrons by a given factor to generate a current i(t). Current i(t) varies with electron stream 38 and therefore, during the period that the electron stream from the given light responsive element is directed through aperture 44, current i(t) provides a current which contains the same distribution of power over frequency as the electron stream.

It will be readily apparent that only an electron stream having a cross-section equal to or less than the dimensions of aperture 44 will be fully detected by electron multiplier 46. Since each light responsive element generates an electron stream having a cross-section equal to the area of its light sensitive surface, each light responsive element is considered to comprise a section of photocathode 34 having a light sensitive surface equal to the dimensions of aperture 44. Aperture 44 may usefully be circular and have a diameter of 200 microns. Each picture element therefore comprises the intensity of light, and the distribution thereof of optical power over frequency, which impinges upon a discrete incremental area of detector plane 32 which is circular and has a diameter of 200 microns.

Referring further to FIG. 1, there is shown light from laser 18 reflected to optical delay line 48 through beam splitter 20, and coupled therefrom, through beam expanding telescope 50, to acousto-optic beam deflector 52. Optic beam deflector 52 shifts the frequency of the light of laser 18 to provide a local oscillator coherent light signal 54 having a frequency which is greater or less than $v_P$, the frequency of continuous wave laser 18, the difference being equal to an intermediate frequency which is in the range 10 MHz–100 MHz. Local oscillator signal 54 is focused by flat field scan lens 56 and reflected by beam splitter 30 so that most of the light of local oscillator 54 impinges upon detector plane 32 within an Airy disc of two microns diameter. The position of the Airy disc on detector plane 32 is determined by deflection of local oscillator signal 54 by beam deflector 52.

Optical delay line 48 is a conventional device selected to delay a wavefront of light from laser 18 by the same time which would be required for the wavefront to reach apparatus 16 by reflection from object 10, and without refraction by any of the particles 14. Beam expanding telescope 50 may usefully comprise a BET 25, manufactured by JODON. Acousto-optic beam deflector 52 comprises a well-known device which has the capability of introducing the aforementioned frequency shift, and usefully comprises a device such as the Acousto-Optic Laser Beam Deflector Scanner, model LV401, manufactured by ISOMET.

In addition to providing the above frequency shifting capability, beam deflector 52 selectively deflects local oscillator signal 54, in response to an electric driving signal $e_f(t)$ coupled thereto from acousto optic beam deflector driver 58. Driver 58, comprising a conventional electronic circuit used in conjunction with beam deflector 52, provides driving signals $e_f(t)$ that cause the two micron Airy disc of local oscillator signal 54 to be sequentially focused upon the light sensitive surface of each of the light responsive elements comprising photo cathode 34.

It will be readily apparent that when a given signal $e_f(t)$ causes the Airy disc of local oscillator signal 54 to be focused upon a given light responsive element, heterodyning will occur between local oscillator signal 54 and the picture element which impinges upon the light sensitive surface of the given light responsive element. The heterodyning or mixing causes a heterodyned electron stream of two microns diameter to be projected into drift tube 40. Each heterodyned electron stream comprises frequency components included within a bandwidth of $v_S$, which is centered at the aforementioned intermediate frequency, and the frequency components of a heterodyned electron stream respectively represent the frequency components of one of the impinging picture elements. Consequently, each heterodyned electron stream projected into drift tube 40 comprises the frequency spectrum of a picture element, shifted to the intermediate frequency.

Referring once again to FIG. 1, there is shown photo cathode scan synchronizer 60 receiving optic beam deflector driving signals $e_{f(t)}$ from driver 58. Synchronizer 60 may comprise a conventional circuit, such as a simple analog circuit, which upon receiving a given signal $e_f(t)$ provides a corresponding signal $e_d(t)$. Each signal $e_d(t)$ is coupled to deflection coils 42 to provide the aforementioned deflection signal required for the operation thereof. Synchronizer 60 is structured so that when a particular signal $e_f(t)$ causes the Airy disc to be focused upon a particular light responsive element of photo cathode 34, and therefore to generate a heterodyned electron stream representing a particular picture element of the light impinging upon apparatus 16, synchronizer 60 generates a signal $e_d(t)$ which causes deflection coils 42 to direct the heterodyned electron stream through aperture 44 to electron multiplier 46. Consequently, as the Airy disc of local oscillator signal 54 is sequentially focused on the light sensitive surface of each of the light responsive elements comprising photo cathode 34, a current i(t) is generated which represents the power distribution over frequency, or frequency spectrum, of each picture element of the light impinging upon apparatus 16. Current i(t) comprises the same frequency components as the heterodyne electron streams.

In an alternative, synchronizer 60 may comprise a mini-computer programmed to generate signals $e_f(t)$ and $e_d(t)$ to cause the local oscillator Airy disc to be focused upon a particular light sensitive surface while the heterodyned electron stream generated thereby is directed through aperture 44 to multiplier 46. Dwell time, the time that the Airy disc is focused upon a particular light sensitive surface, as well as scan sequence, could also be programmed into the mini-computer.

Referring once more to FIG. 1, there is shown current i(t) coupled to lock-in amplifier 62, a conventional narrow-band filter which is set to exclude all frequency components in current i(t) not included in a frequency range $\nu_I$, which may be 1 kHz bandwidth, for example, centered at the aforementioned intermediate frequency. The driving signal $e_f(t)$ is coupled from driver 58 to lock-in amplifier 62 so that the passband of amplifier 62 is always centered at the intermediate frequency, regardless of the specific value of the intermediate frequency. The output of amplifier 62, comprising a filtered current i'(t), therefore represents the image of object 10, undistorted by the interference of scattering, and is coupled to video circuit 64. Video circuit 64 comprises an array of conventional video circuitry which processes current i'(t), and causes the image represented thereby to be displayed by video display 66.

Referring to FIG. 3, there is shown an image 68 of object 10, carried upon the wave front of reflected coherent light beam 26a, focused by lens 28 upon detector plane 32 of photo cathode 34 as previously described. Also as previously described, scattered light 70 which degrades image 68, impinges upon detector plane 32 due to back scattered light 24b and forward scattered light 26b.

A grid has been superimposed upon detector plane 32 in FIG. 3 to illustrate an array of discrete light responsive elements 72 which comprise photocathode 34, a light responsive element 72A being broken away from photo cathode 34 for purposes of illustration. As aforementioned, light responsive element 72 comprises the section of photo cathode 34 from which a stream of electrons 38 is projected through aperture 44 to multiplier 46 when a unique coil deflection signal $e_d(t)$ is coupled to coils 42.

Referring further to FIG. 3, there is shown light responsive element 72B broken away from photo cathode 34, a picture element comprising a first component of light 76A and a second component of light 76B impinging upon light sensitive surface 74 of element 72B. Light 76A represents a portion or segment of an image of object 10. Light 76B represents a portion of the scattered light impinging upon photo cathode 34. When local oscillator signal 54 is focused within an Airy disc 78 upon the light sensitive surface 74 of element 72B, an electron stream 38 is generated by element 72B, electron stream 38 including heterodyned electron stream 80. As previously described, hetrodyned electron stream 80 comprises frequency components which represent both light components 76A and 76B of the light impinging upon element 74B.

To modify the above embodiment in order to provide particular operational characteristics, one or more of the following relationships may usefully be employed:

$$\Delta t \approx 1/\nu_I \tag{1}$$

$$T = N\Delta t = N/\nu_I \tag{2}$$

$$T = N/M\Delta \nu_I \tag{3}$$

In equation (1), $\Delta t$ is the dwell time, or time that the local oscillator signal is focused on a particular light responsive element and that the electron stream from the element is scanned by electron multiplier 46. Equation (1) indicates that dwell time is approximately equal to the reciprocal of the width of the passband of lock-in amplifier $\delta \nu$, $84_I$. $\nu_I$ represents the degree of scatter discrimination.

In equation (2), N is the number of discrete light responsive elements into which photocathode 34 is divided, and is therefore the number of discrete picture elements which are processed by apparatus 16 in providing an image of object 10. To improve the resolution of a provided image, N must be increased. It is clear from equation (2) that improving resolution, without reducing the degree of scatter discrimination, causes an increase in T, the time required to form an entire image of an object.

In equation (3), M is the number of picture elements which are processed simultaneously, in a modification of the above embodiment which employs an image dissector having M apertures, M electron stream receiving means, and M filtering means, M being a number greater than 1. An image dissector having multiple apertures is now available, and the use thereof enables multiple picture elements to be processed simultaneously in providing an image of object 10. Consequently, N may be increased to improve resolution of an image without a corresponding increase in the time T required to provide the image or a reduction in the degree of scatter discrimination.

Obviously, many modifications and variations of the present invention are possible in the light of the above teachings, and, it is therefore understood that within the scope of the disclosed inventive concept, the invention may be practiced otherwise than specifically described.

What is claimed is:

1. Optical heterodyne apparatus for extending the range at which a diffusive object may be viewed through a dynamic diffusive medium, said apparatus comprising:

an array of discrete light responsive elements, each of said light responsive elements having a light sensitive surface and comprising means for generating an electric signal that represents the light impinging upon its light sensitive surface;

lens means receiving a first coherent light signal transmitted from said object through said dynamic diffusive medium, an image of said object being carried upon the wavefront of said first coherent light signal, said first coherent light signal comprising frequency components which are included in a first frequency range of selected bandwidth which is centered at a first optical frequency, said lens means comprising means for focusing said first coherent light signal on said array of light responsive elements so that each picture element in an array of discrete picture elements comprising said carried image impinges upon the light sensitive surface of a different one of said discrete light responsive elements;

means for providing a second coherent light signal of a second optical frequency, said first and second optical frequencies being different, said frequency difference being equal to an intermediate frequency;

focusing means for focusing said second coherent light signal within an Airy disc upon the light sensitive surface of each of said discrete light responsive elements in a pre-selected sequence, each light responsive element generating a discrete heterodyne signal when said second coherent light signal is focused upon its light sensitive surface, each of said discrete heterodyne signals comprising an information component and a scatter interference component, the information component of the heterodyne signal generated by a given one of said light responsive elements representing the picture element of said image which impinges upon the light sensitive surface of said given light responsive element;

means receiving said heterodyne signals for filtering said scatter interference components out of said heterodyne signals;

means for directing the heterodyne signal generated by each of said light responsive elements to said filter means in said pre-selected order;

means for synchronously operating said focusing means and said directing means so that said focusing means focuses said second coherent light signal within an Airy disc upon the light sensitive surface of a particular light responsive element when the heterodyne signal generated by said particular light responsive element is directed to said filter means by said directing means;

signal exclusion means positioned between said array of light responsive elements and said filter means for preventing said filter means from receiving signals generated by any of said light responsive elements except the light responsive element upon which said second coherent light signal is focused; and means receiving filtered heterodyne signals from said filter means in said pre-selected order for enabling a viewable representation of said diffusive object to be provided.

2. The apparatus of claim 1 wherein:
said synchronous means comprises means for operating said focusing means to focus said second coherent light signal within an Airy disc upon the light sensitive surface of said particular light responsive element during a dwell time period in a sequence of dwell time periods of selected duration, and for operating said directing means to direct the heterodyne signal generated by said particular light responsive element to said filter means during the same dwell time period.

3. The apparatus of claim 2 wherein:
the area of each of said light sensitive surfaces of said light responsive elements is sufficiently small that a viewable representation of said image is provided by combining the picture elements respectively represented by said discrete heterodyne signals, the area of each of said light sensitive surfaces being sufficiently large that none of said areas is less than the area of said focused Airy disc.

4. The apparatus of claim 3 wherein:
each of said light responsive elements comprises a means for projecting an electron stream having frequency components included within a second frequency range having a bandwidth equal to said selected bandwidth and centered at said intermediate frequency, the information component of each of said heterodyne signals comprising frequency components included in a third frequency range, said third frequency range having a bandwidth which is substantially less than said selected bandwidth and which is centered at said intermediate frequency.

5. The apparatus of claim 4 wherein:
said signal exclusion means comprises a barrier means positioned between said array of light responsive elements and said filter means, said barrier means being provided with an aperture having an area and dimensions equal to the area and dimensions of the light sensitive surfaces of said light responsive elements;

said directing means comprises means for directing the electron stream generated by each of said light responsive elements through said aperture to said filter means in said pre-selected sequence; and said focusing means comprises means for focusing said second coherent light signal upon each of said light sensitive surfaces within an Airy disc having an area which is very small in comparison with the area of said aperture.

6. The apparatus of claim 5 wherein:
said synchronous means includes a mini-computer system.

7. The apparatus of claim 6 wherein:
said filter means comprises a lock-in amplifier having a passband which coincides with said third frequency range.

8. The apparatus of claim 5 wherein:
each of said light responsive elements comprises an incremental section of the photo cathode of an image dissector, each of said light sensitive surfaces comprising an incremental area of the detector plane of said photo cathode, a given one of said light responsive elements comprising the incremental section of said photo cathode which generates the electron stream which is directed through said aperture during a given one of said dwell time periods in said sequence of dwell time periods, said aperture having an area which is in excess of one hundred times the area of said Airy disc.

9. The apparatus of claim 5 wherein:
said apparatus includes means for projecting coherent light upon said object so that projected light is reflected from said object back to said apparatus through said dynamic diffusive medium.

10. The apparatus of claim 9 wherein:

said projecting means comprises a source of coherent light; and
an optical frequency shifting means receives light from said source for providing said second coherent light signal.

11. The apparatus of claim 10 wherein:
said coherent light source comprises means for providing a continuous wave laser of said first selected frequency.

* * * * *